United States Patent [19]

Brelsford et al.

[11] Patent Number: 4,674,038

[45] Date of Patent: Jun. 16, 1987

[54] RECOVERY OF GUEST VIRTUAL MACHINES AFTER FAILURE OF A HOST REAL MACHINE

[75] Inventors: David P. Brelsford, Hyde Park; Daniel D. Cerutti, Kingston; Leslie S. Coleman, Rhinebeck; Gerald A. Davison, Ulster Park; Pamela H. Dewey, Poughkeepsie; Margaret C. Enichen, Poughkeepsie; Sarah T. Hartley, Poughkeepsie; Paul A. Malinowski, Poughkeepsie; Roger W. Rogers, Poughkeepsie; Peter H. Tallman, Wappingers Falls; Lynn A. Czak, Rhinebeck, all of N.Y.

[73] Assignee: International Business Machines Corporation, Armonk, N.Y.

[21] Appl. No.: 687,073

[22] Filed: Dec. 28, 1984

[51] Int. Cl.⁴ .................. G06F 9/44; G06F 11/00
[52] U.S. Cl. .................... 364/200; 371/16; 371/20
[58] Field of Search ............ 364/200, 900; 371/12, 371/16, 8, 10, 7; 235/302.1

[56] References Cited

U.S. PATENT DOCUMENTS

| | | | |
|---|---|---|---|
| 4,053,752 | 10/1977 | DeJohn et al. | 235/302.1 |
| 4,253,145 | 2/1981 | Goldberg | 364/200 |
| 4,326,251 | 4/1982 | Davis et al. | 364/200 |
| 4,400,769 | 8/1983 | Kaneda et al. | 364/200 |
| 4,456,954 | 6/1984 | Bullions, III et al. | 364/200 |
| 4,493,035 | 1/1985 | MacGregor et al. | 364/200 |
| 4,513,417 | 4/1985 | Lamb et al. | 371/12 |
| 4,514,846 | 4/1985 | Federico et al. | 371/16 |
| 4,521,847 | 6/1985 | Ziehm et al. | 364/184 |

OTHER PUBLICATIONS

Reynolds, V=R Virtual Machine Recovery/Survival, IBM Technical Disclosure Bulletin, vol. 25, 113, Apr. 83, pp. 6278-6279.

*Primary Examiner*—Gareth D. Shaw
*Assistant Examiner*—Randy W. Lacasse
*Attorney, Agent, or Firm*—Joseph A. Biela

[57] ABSTRACT

The invention disclosed and claimed herein provides a method for a virtual machine, which maps to the V=R region of a host machine's address space, to resume program execution successfully when the host operating system terminates and subsequently restarts successfully after the occurrence of a system incident. The system incident brings the computer system down, but with a reasonable chance that the system will be able to bounce. A bounce occurs when the host operating system nucleus is reinitialized or refreshed. The virtual machine will be allowed to survive the system incident as long as its integrity can be maintained, i.e. as long as its status and in-progress work can be preserved. The status and in-progress work of the virtual machine is preserved in a reserved region of host storage in such a way that the time to save and restore virtual machine status is reduced, I/O that might cause further system incidents are avoided and the complexity of restoration of the virtual machine during a system incident is reduced.

4 Claims, 10 Drawing Figures

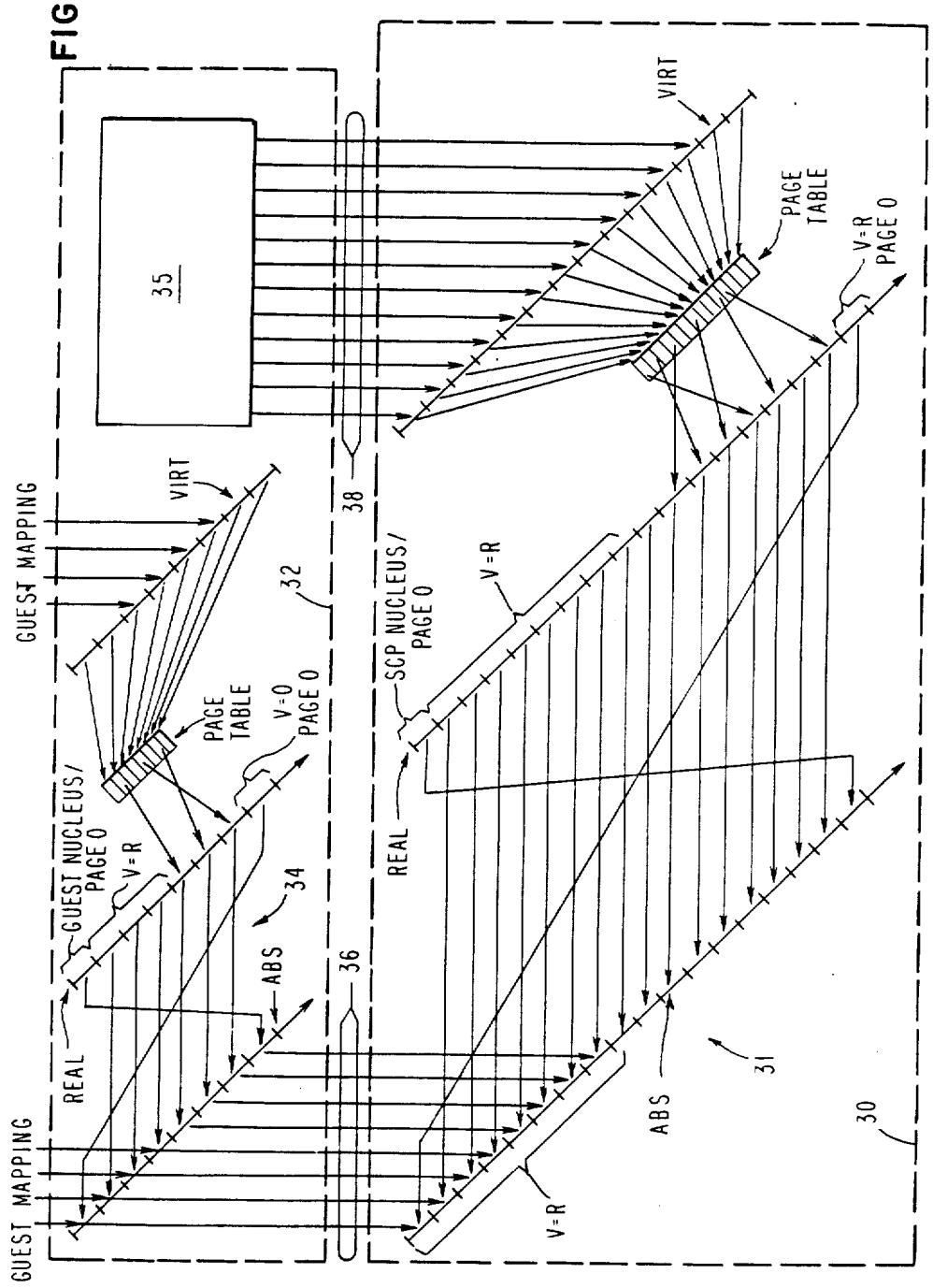

| IPL RECORD | |
|---|---|
| RDEV | MACHINE CHECK |
| TIME REQUEST | RESERVED |
| RESERVED | RESERVED |

# 4,674,038

RECOVERY OF GUEST VIRTUAL MACHINES AFTER FAILURE OF A HOST REAL MACHINE

BACKGROUND OF THE INVENTION

1. Field of the Invention

The present invention relates to computer systems and more particularly to virtual machine systems which provide for the survival of a guest virtual machine when certain hardware and software failures occur.

2. Prior Art

The architecture of the IBM System/370-XA (370-XA mode) is described in publication SA22-7085. The IBM System/370-XA has evolved from the IBM System/370 Architecture (370 mode) which is described in publication GA22-7000. The System/370-XA can be implemented for a virtual machine (guest machine) by a virtual machine operating system (host system) implemented on a System/370-XA real machine (host machine). The System/370 architecture can also be implemented for a virtual machine (guest machine) of the host system.

Amdahl, Inc. was an early developer of a system recovery program, i.e. performance enhancement VM/PE. VM/PE is not capable of handling virtual machines and is an interface to the operating system.

IBM Technical Disclosure Bulletin, Vol. 25, § 113, April 1983, pp. 6278-6279 discloses a V=R virtual machine recovery program that is used with an IBM System/370 to preserve the status of a V=R guest across an abend. When a control program software failure occurs, this recovery program restores the V=R virtual machine environment when System/370 is re-initial program loaded (bootstrap). I/O interrupt data is saved in a data buffer rather than reflected to the virtual machine. The V=R user is again logged on such that its virtual machine environment is restored.

For host operating system to perform functions on behalf of a guest operating system, a start interpretive execution (SIE) instruction is implemented in the hardware. (The SIE instruction is described in U.S. Pat. No. 4,456,954, which issued on June 26, 1984 to the assignee of the present application, and is incorporated herein by reference.) The SIE instruction invokes interpretive execution hardware in the host machine in order for the host machine to enter the interpretive execution mode for the purpose of executing a program in a guest machine.

The host machine, while in an interpretive execution mode, performs the functions of a guest (an interpreted machine). The interpretive execution of one of several guest machines begins when the host system executes a start interpretive execution (SIE) instruction. The operand of the SIE instruction is referred to as the state descriptor. The state descriptor, which is located in real storage, includes parameters that describe the logical condition of the guest whose instructions are to be executed (interpreted). In particular, fields in the state descriptor specify the architecture of the guest, the contents of some of the program-addressable guest registers, the addresses of related control tables, the initial state of the guest CPU, and information about other aspects of the operation to include how host storage is to be used to represent guest main storage (guest storage mode).

Storage modes are specified in a field of the state descriptor. Guest main (absolute) storage is represented by host storage in either pageable storage mode or preferred storage mode. In the preferred storage mode, the preferred guest is assigned the lower portion (V=R region) of the host's absolute main storage beginning at host absolute address zero. In other words, a guest absolute storage address is treated as the corresponding host absolute storage address when preferred storage mode is specified in the guest state descriptor. This means that instruction and operand addresses in the preferred guest are treated directly as host absolute main storage addresses.

Reference and change preservation (RCP) is the SIE facility that manages the reference and change bits of a storage key byte associated with a page frame in host real storage. The SIE instruction, through the interpretive execution hardware, maintains storage key bytes in response to storage key manipulating instructions issued by a guest. SIE causes the interpretive execution hardware to interpret these storage key manipulating instructions thereby using the RCP facility in the interpretation.

In the case of a preferred (V=R) guest, interpretive execution hardware provides for the preferred guest to manipulate the actual storage key bytes. The RCP facility is not used since the storage key bytes are owned by the preferred guest, i.e. the page frames are used solely by the preferred guest and are not paged by the host.

When a host machine supports a virtual machine environment, the host machine's system control program is capable of clearing channel paths on reset. Such an incident of clearing channel paths would prevent the recovery or survival of a guest following a system incident. (System incidents are described below.) For example, a problem arises when the host machine shares a control unit with a virtual I/O device and there is no other channel path to this device and a contingent connection (uncleared control unit check) occurs at a system incident or failure. When all three conditions occur simultaneously, the operator must perform an IPL or a SYSTEM RESET operation either of which will destroy the preferred guest. (Of course, if any of the above conditions do not occur, the host control program is able to retain guest I/O status including interrupts and reserves.

An object of this invention is to assign a reserved area of host main storage to a virtual machine to contain its status and in-progress work which won't be cleared due to a system failure and which can be used for the recovery of a virtual machine, i.e. restoration of the virtual machine operating system, once the host operating system has been refreshed.

Another object of this invention is to include control blocks within the assigned area of host main storage to be used for preserving the status of a virtual machine and for returning the virtual machine to its operational state, i.e. maintaining guest operating system integrity, following a system failure.

An object of this invention is for all (free) storage requests, made on behalf of the virtual machine while the system is running, to be obtained from a reserved area of storage.

An object of this invention is to restore the I/O to substantially the same configuration that the virtual machine was using prior to a system incident once the host operating system was refreshed (bounce completed) and the virtual machine has survived.

It is also an object of this invention to identify the real I/O devices to the recoverable virtual machine following a system failure.

Another object of the invention is to provide for automatic recovery of a virtual machine following a system failure.

A further object of this invention is to provide virtual machine recovery for substantially any operating system that will support recovery on the architected hardware.

The following publications contain the background information for the invention disclosed and claimed herein and are incorporated herein by reference.

1. IBM publication SA22-7095 (file number S370-01) entitled "IBM System/370 Extended Architecture —Interpretive Execution".

2. Gum, P. H., "System/370 Extended Architecture: Facilities for Virtual Machines", IBM Journal of Research and Development, Vol. 27, No. 6, November 1983.

SUMMARY OF THE INVENTION

A method for providing for virtual machine survival following a system incident is disclosed and claimed in which an area of storage is assigned to a virtual machine. The system incident is detected and data in a portion of the storage is recorded in a virtual machine control block which is in the area of storage assigned to the virtual machine. The real machine is terminated and the virtual machine is suspended in response to the detection of the system incident. The operating system in the real machine is refreshed and the data in the control block is restored in the portion of storage from which it was recorded. The method is implemented in a data processing system that includes storage, a channel subsystem which is attached to I/O devices, and at least one real machine that executes a host operating system that provides for the operation of at least one virtual machine. The virtual machine includes a processor that executes a guest operating system.

BRIEF DESCRIPTION OF THE DRAWINGS

FIG. 1b is a block diagram showing the logical structure of an embodiment of the data processing system of FIG. 1a;

FIG. 2a is a diagram showing conceptually how address spaces are mapped in the data processing system of FIG. 1a.

FIG. 2b is a diagram showing conceptually how one address space is mapped;

FIG. 3 is a diagram showing a control block containing data stored in the lower part of storage in the data processing system of FIG. 1a;

DESCRIPTION OF THE PREFERRED EMBODIMENT

Figure 1A:
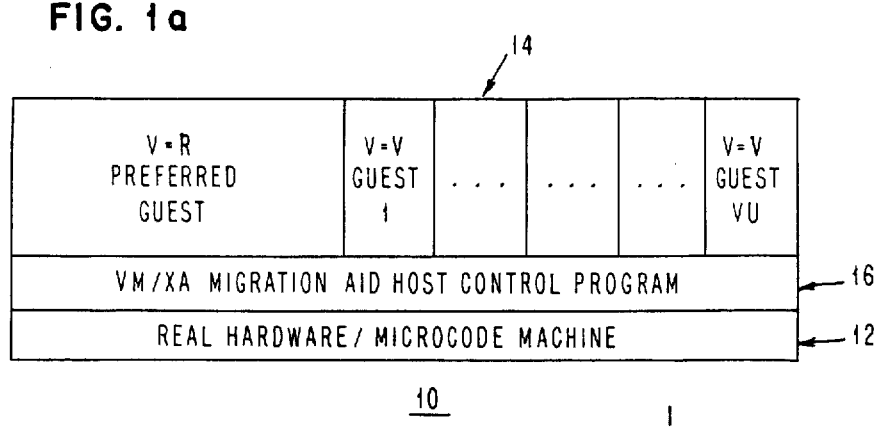
FIG. 1a is a block diagram conceptually showing the configuration of a data processing system.

FIG. 1a shows the configuration of computer system 10 referred to as a virtual machine (VM) system. The VM system includes real machine (host machine) 12 and a plurality (n+1) of virtual machines (guest machines) 14 supported by the real machine. The real machine includes central processing unit (CPU) 16 that executes a system control program (SCP), which manages real machine resources (CPU, memory and input/output (I/O)) and provides services to the guests. In particular, the SCP controls the resources of the real machine while providing each user with a virtual machine environment that includes virtual machine resources such as (virtual) storage, i.e. virtual machine address space, and a (virtual) CPU. This means that each guest has an architecture that is emulated or simulated by the host. From the user's perspective, each guest appears to be a complete computer system having an assigned set of resources (described for each guest). One characteristic of the VM system is that each virtual machine environment is substantially the same as a real machine environment such that an operating system and applications program doing user work (guest programs) running in each virtual machine cannot detect the difference, though the environments are in fact different. This means that the actual operating environment is transparent to each guest program. In order for the actual operating environment to be transparent to a guest program, the same changes must occur, with respect to the resources to which the guest has access, in the virtual machine environment as would occur if the guest program were running in the real machine.

Figure 1B:
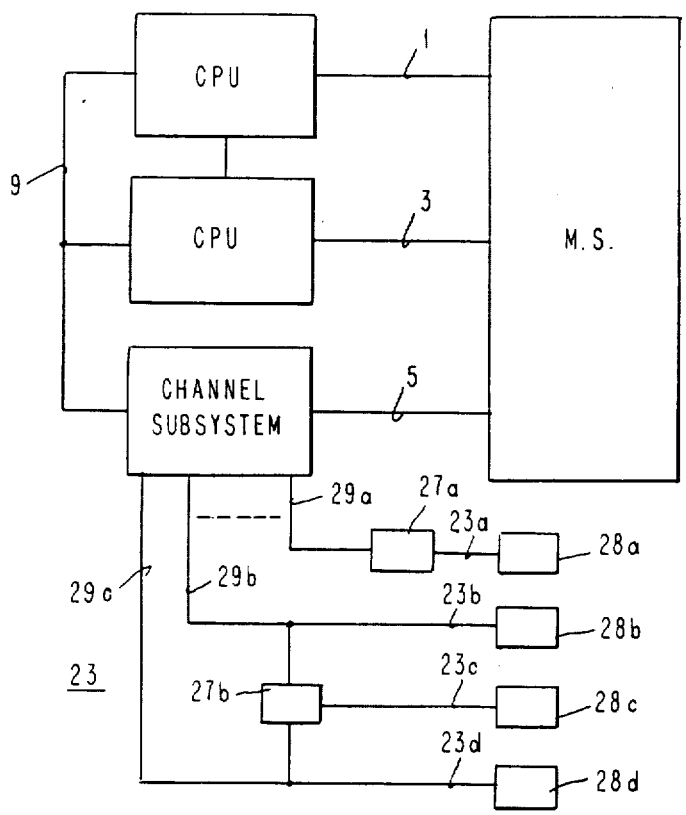

FIG. 1b shows the logical structure of an embodiment of the VM system configuration of FIG. 1a. As shown in FIG. 1b VM system 23 includes main storage (MS), two CPUs, and channel subsystem connected to I/O devices, 28a, 28b, 28c and 28d, through control units 27a and 27b. A channel path (29a, 29b, 29c) is the physical path between the channel subsystem (I/O facilities) and one or more control units. I/O devices are attached through control units to the channel subsystem via channel paths. A single channel subsystem has a single set of subchannels (23a, 23b, 23c, 23d). Each subchannel is uniquely associated with one I/O device, and that I/O device is uniquely associated with that one subchannel within the channel subsystem, regardless of the number of channel paths by which the I/O device is accessible to the channel subsystem. Control units may be attached to the channel subsystem via more than one channel path, and an I/O device may be attached to more than one control unit. The CPUs, the channel subsystem and main storage are connected together by lines 1, 3, 5 and 9.

In this embodiment, the host machine executes a version of the host machine's system control program (SCP) VM/XA Migration Aid (a first level program). A guest executes, for example, the multiple virtual storage MVS SCP or VM/XA Migration Aid SCP (a second level program) which is initiated by an invocation of SIE by the host. In this example, the host uses IBM System/370 extended architecture and the guest uses IBM System/370 architecture or IBM System/370 extended architecture. Within VM/XA Migration Aid, there will be one host virtual storage mapping for each unique guest system. The (preferred) guest operating system runs in the region of storage where guest real addresses are those of the host real addresses (plus a fixed offset which is zero for the VM/XA Migration Aid). Since it is an object of this invention to permit the survival of (preferred) guest operating systems supporting System/370 architecture or System/370 extended architecture (or their equivalents), it is a requirement that the status of all types of virtual machines be retained over a system incident including CPU and I/O status. Also, unavoidable losses of this status must be detected and reflected to the guest operating system in a way that can be handled by the architecture supported by the guest operating system.

Address Translation and Host Storage Mapping

FIG. 2a shows conceptually how address spaces (slanted lines) are mapped when an SIE instruction is executed by the host. (The address spaces are divided into 4K pages (tic marks).) The address spaces of host 31 are shown in block 30. The address spaces of a guest are shown in block 32. In this embodiment, the guest is preferred (V=R) guest 34. Mapping of the absolute address space of preferred guest 34 to the host absolute address space is shown by lines 36. (Mapping of the absolute address space of pageable (non-preferred) guest 35 to the host virtual address space is shown by lines 38.)

Figures 2B, 3:
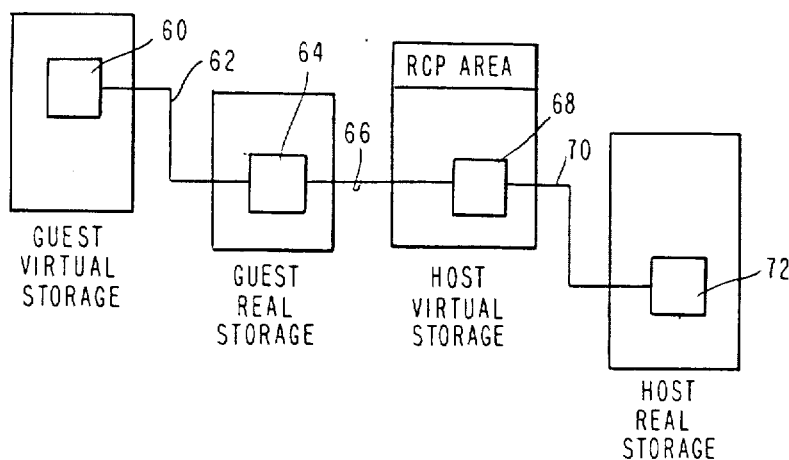
Figure 4:
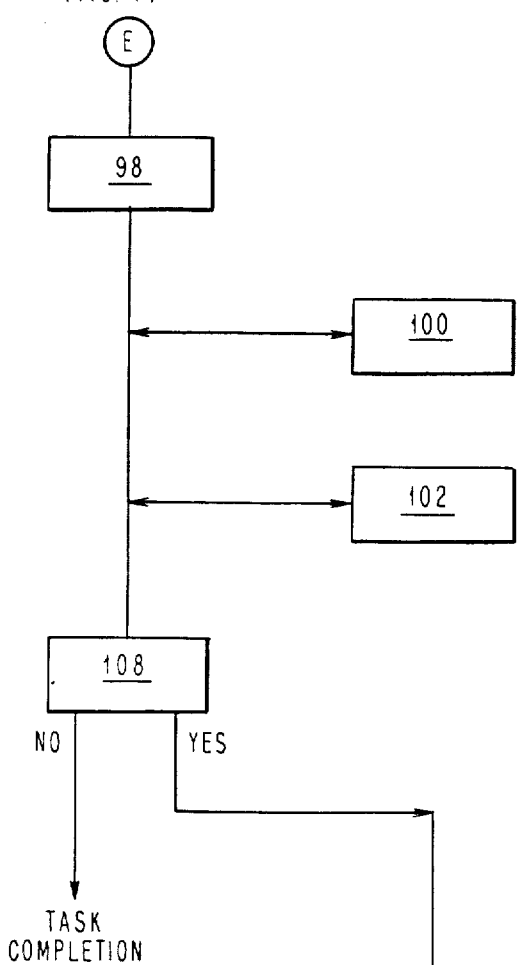
FIGS. 4-7 is one flow chart showing the response of the data processing system to a system incident.
Figure 5:
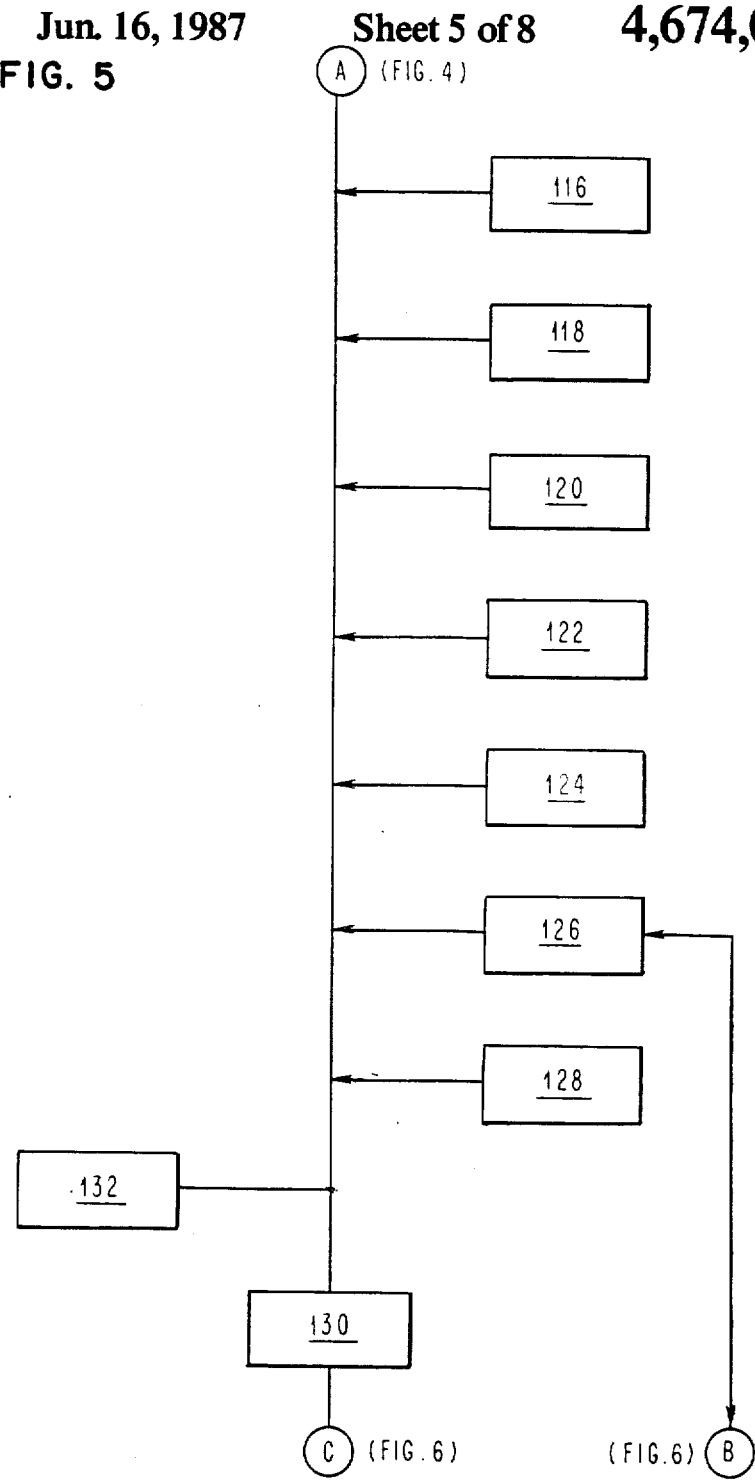
Figure 6:
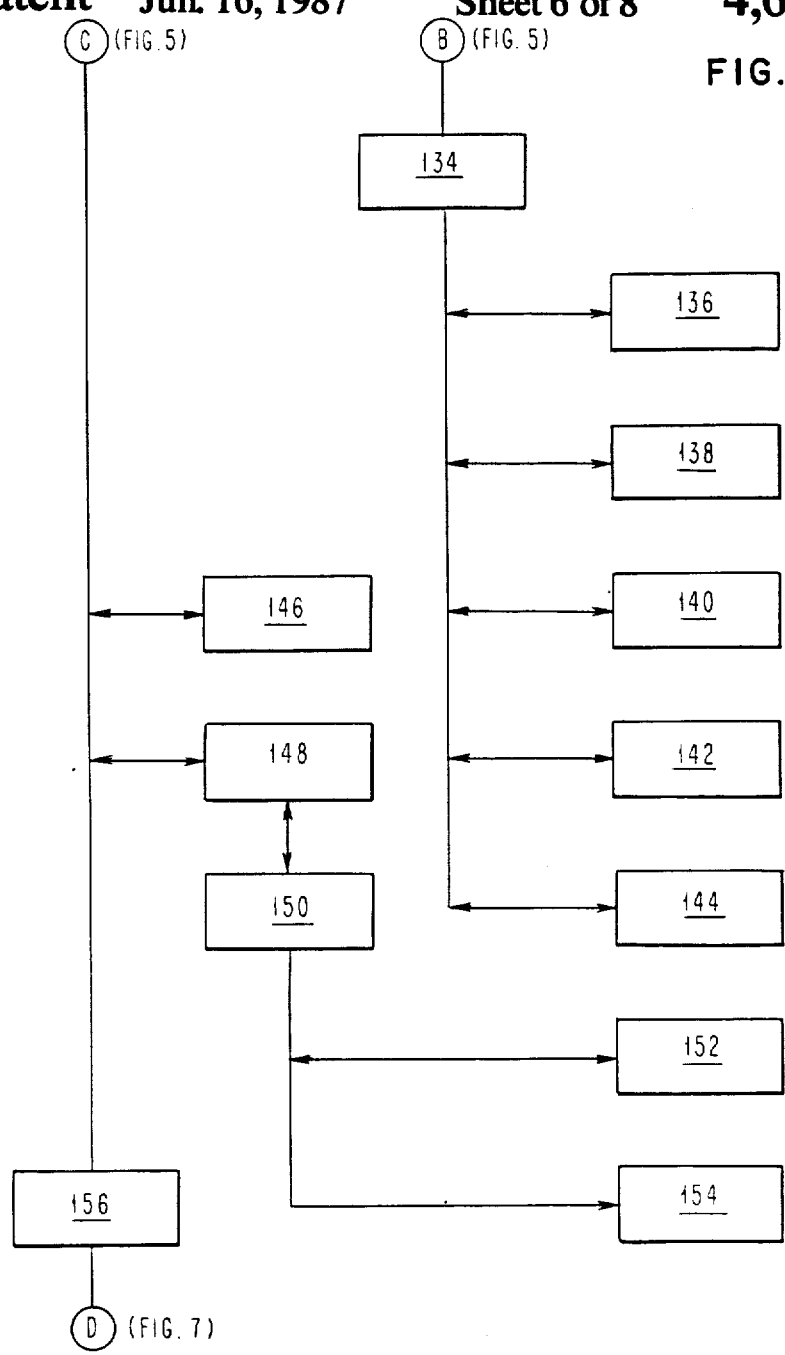
Figure 7:
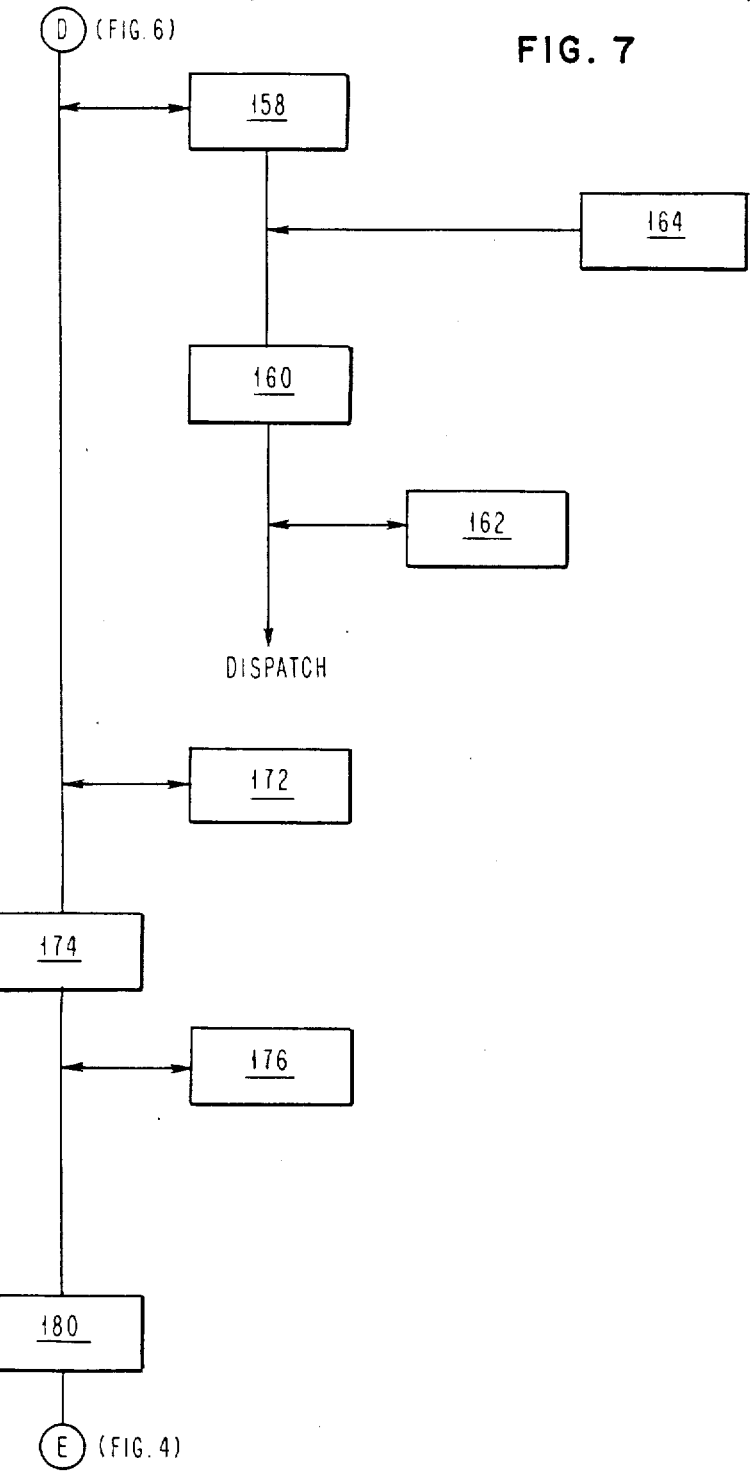

FIG. 2b shows conceptually how one address is mapped from guest virtual storage to host real storage. A preferred guest operating system makes a reference to information in virtual page 60 at address X'aaaaannn'. The guest operating system causes the dynamic address translation facility (DAT) to translate the address (line 62) to guest real page 64 at address X'bbbbbnnn'. For pageable guests, SIE now causes a fixed offset to be added (line 66) yielding a page in host virtual page 68 at an address X'cccccnnn'. (The offset is normally 0 causing bbbbb to be equal to ccccc, but for operating systems with multiple V=R regions, the offset will be greater than zero for some regions.) SIE causes DAT to be invoked again (line 70) translating the address to page 72 at address X'dddddnnn' in host real storage. (If ddddd equals 00000 or ddddd equals the value in the prefix register (ppppp), then ppppp and 00000 are swapped finally yielding an absolute address.) Using the above notation for a guest running in the V=R region (a preferred guest), bbbbb is equal to ccccc (plus an offset) and ccccc plus offset is equal to ddddd. This permits accelerated addressing (preferred mode addressing) directly from guest virtual storage to host real storage.

Guest Storage Mapping

The preferred guest may or may not include a virtual address space (virt.), but it always includes a real address space (real) and an absolute address space (abs.). For preferred guest 34, the interpretive execution hardware in the host provides for the mapping of the preferred guest's absolute address space directly to the host's absolute address space (V=R) with a one-to-one correspondence.

In other words, preferred guest absolute addresses are effectively treated unmodified as host absolute addresses. Direct mapping of preferred guest absolute to level 1 host absolute is performed. (Mapping of guest virtual addresses to guest real addresses is performed by the DAT facility and mapping of guest real addresses to guest absolute addresses is performed by guest prefixing.)

For preferred guest to host mapping, no RCP bytes are involved. The real storage key bytes of the host absolute storage are manipulated when preferred guest 34 attempts to execute a key manipulating instruction affecting the host's real storage key bytes. Each storage key byte has only one owner.

System Incident

The invention disclosed and claimed herein provides for a guest, which is assigned (maps) to the V=R region of the host's absolute address space, to resume program execution successfully when the host, i.e. the SCP, terminates and subsequently restarts successfully after the occurrence of a system incident. This requires that the status, including memory, CPU and I/O status, of the guest be retained (always) in a reserved area of storage. Unavoidable losses of this status will be detected and reflected to the guest operating system. This prevents the guest from proceeding and, thereby, potentially damaging its operating system. The system incident brings the system down, but with a reasonable chance that the system will be able to bounce. A bounce is defined herein as refreshing the host operating system nucleus or host SCP. In this case, a system incident can be as a result of a (A) software abend or a (B) hardware malfunction.

(A) A software abend is an abnormal termination which occurs when the host control program detects internal errors.

(B) A hardware malfunction, can be a machine check, a channel check, a checkstop or a malfunction detected as part of an I/O operation. A hardware malfunction is not caused by data or instructions.

A system incident can be of sufficient magnitude to prevent further execution of the host SCP, without refreshing the SCP and re-establishing internal descriptive and control information (control blocks).

Interruptions

When SIE is executed by the host to process preferred guest instructions, two locations will provide the interpretive execution hardware with prefix values: the host prefix register which always contains the host (CPU) prefix value and the state descriptor which contains the guest (virtual CPU) prefix value. The host prefix register is always used for the processing of host interruptions and therefore must always contain the host prefix value. In other words, a host interruption, i.e. a machine check interruption, will occur in host real page 0 (host prefix page) and a preferred guest interruption, or other reference, will occur in preferred guest real page 0.

A machine check interruption causes actions to be taken which are described in the above-cited references. Generally, for all machine check interruptions, a machine check interruption code (MCIC) is provided in host real storage (host real page 0 or prefix page) for identifying the type of machine check condition that caused the interruption. The MCIC identifies the cause and severity of the hardware malfunction. For example, bit two (when set) indicates a system recovery condition and bit eleven (when set) indicates that a malfunction has occurred in the channel subsystem or that the subsystem is in the check-stop state such that instructions and interruptions are not executed. Bits 16 through 18 (when set) are used to indicate an invalid checking block code (CBC) detected in host main storage (CPU registers) or in a real storage key. The machine check failing storage address field identifies and stores in host real storage an address within a storage checking block in main storage that contains the fault, or within the CBC associated with the real storage key that contains the fault. Additional information for identifying the location of the fault and for recovering the state of the real machine are provided by the contents of the machine check logout area in the host prefix page 0.

The guest definition block VMDBK (discussed below) contains the address of the channel control block (CHCBK) for the virtual CPU. The channel control block controls the status of pending I/O interrupts for the virtual machine. The address in the guest definition control block is set when the guest logs on to the system, i.e. when the channel control block is allocated, and remains unchanged even during guest survival processing. (All subsequent references to entries in the VMDBK include the three letter prefix VMD.)

Refreshing the System Nucleus

The host operating system can be reinitialized (refreshed) by a portion of the host SCP, following a system incident. In other words, for some system incidents, a small portion of the host SCP can refresh the remainder of the host SCP without requiring manual operator intervention or a re-initial program loading (re-IPL). Refreshing the host SCP (system nucleus) is called a bounce. (If the operator re-initializes program loading (re-IPL), then I/O hardware is reset and survival is not possible.) Information about the host I/O device will be saved.

Non-Recovery Conditions

Automatic guest survival (recovery) will almost always be attempted following a system incident when the host operating system is refreshed. However, the preferred guest will not be allowed to survive when it is uncertain whether the integrity of the preferred guest can be maintained. A preferred guest will not survive (and not be allowed to survive) following a bounce when (1) the reserved area has been exhausted and information necessary to restore the guest cannot be saved, (2) there is incorrect data in the preferred guest definition block (VMDBK) or in a prefix page, (3) more than one error (abend, machine check or check stop) occurred during the system incident, or (4) the time-of-day clock has been reset. Bounce is suppressed when, for example, (1) hardware failure is indicated by an invalid MCIC, (2) a processor is in an unknown state, (3) there is severe I/O subsystem damage, (4) there is an error in error recovery software, (5) a machine check shows damage to a storage page that the SCP nucleus occupies, (6) there is damage to the V=R recovery area, or (7) insufficient space is allocated to preserve device information for a RDEV. (Guest recovery will begin in a reserved area or region of storage as discussed below.) Except for the recovery processor and any processor in an unknown state, all processors will be in either the stopped state, a disabled wait state or a check-stop state.

Recovery won't occur (won't be attempted) if the detected malfunction causes recursive system incidents. Certain hardware malfunctions will also make guest survival impossible due to permanent damage to the host nucleus (host page 0) or to the host (V=R) absolute storage area for the preferred guest, i.e. a lost page in the V=R area or within the area where the host control program nucleus is to be loaded when the VM system is IPLed. Any system incident which will put the host machine in a disabled wait state will make guest survival impossible. Also, guest survival will be suppressed when I/O initialization resets any path to a V=R guest dedicated device.

Tracing the preferred guest is a condition for not permitting the preferred guest to survive a system incident. Guest survival will also be prevented if the preferred guest issues the SIE instruction (uses the virtual SIE support as disclosed in co-pending patent application Ser. No. 635,388). Bits are set in the guest definition block (VMDBK) to indicate when the guest is using the trace facility on the virtual CPU or virtual SIE support is being used.

Other conditions which prevent guest survival occur when:
1. A virtual system reset is in progress.
2. An operating system is being IPLed on the guest machine.
3. The guest is logging on or logging off.

Virtual Machine Recovery

Guest (virtual machine) survival is attempted when:

1. the host operating system has reserved a V=R area, of user specified size, in host main (absolute) storage for use by a (preferred V=R) guest, and a (V=R) reserved (free storage) region or area, also of user specified size, used to satisfy all (free) storage requests on behalf of the V=R guest. The size of the V=R area (in bytes) is indicated by SYSVRSZ; the size of the reserved area (in bytes) is indicated by SYSVRFRE. The pre-allocated, user-specified reserved area (region) improves virtual machine recovery by reducing the time to save and restore guest status, by avoiding I/O that might cause further incidents and by reducing the complexity of restoration of the guest during a system incident. All storage requests made on behalf of the guest while the system is running are obtained from the reserved area.

2. the VM system determines that it has a preferred (V=R) guest eligible for attempted survival by examining a bit VMDGSURV in the V=R virtual machine definition (control) block (VMDBK) in the reserved region of host absolute storage. A bounce suppression (or terminal) condition (discussed above) will set the VMDGSURV bit to zero. If a terminal condition is detected, instruction processing continues, but the condition precludes the guest from surviving the system incident since unresolvable data integrity problems could occur. Otherwise, the bit VMDGSURV, when not set to zero, indicates the existence of a guest to be recovered. The user's VMDBK at the start of the reserved region must not be released until the V=R guest (user) logs off. The pointers for this VMDBK are found in the SYSGEN common area in the reserved region. The pointer VMDGSRBK to the guest survival recovery block (GSRBK) is zero if preferred guest recovery cannot be attempted, i.e. when bit VMDGSURV is turned off (zero), or when the V=R guest is being initially logged on. The pointer VMDGSRBK is not zero when the V=R guest is being recovered from a system incident. The user's VMDBK will be addressed by SYSVRLOC during guest recovery. The GSRBK, which is established when the preferred guest logs on to the VM system, contains enough information to restore low storage and to record real device blocks (RDEVs) for the preferred guest;

3. certain I/O interrupt sub-classes which are not used by the host or other guests are assigned to preferred guest I/O devices in order for the host to preserve (pending) interrupts at the occurrence of a system incident. (Interrupt sub-classes are disabled via the control registers.) Guest external interrupts are held pending after a bounce. The VM system reflects conditions, i.e. machine check conditions, to preferred guest operating systems when a bounce has occurred. In particular, interruptions that occurred while the bounce was in progress are reflected to the preferred guest. However, a small window (a discrete amount of time) remains between the time host hardware presents an I/O interrupt and the time when the host operating system has established that this I/O interrupt belongs to the preferred guest operating system. These I/O interrupts are lost and recovery from these situations requires that the preferred guest operating system contain a missing interrupt detection facility;

4. any system incident, detected by some host modules, which causes the VM system to bounce invokes HCPWRPUP which preserves the status of the preferred guest by calling a single software module HCPVRR which includes HCPVRRLN, HCPVRRDC, HCPVRRLD, HCPVRRST, HCPVRRGM and HCPVRRMS (discussed below) that records and supervises the termination of the preferred guest at a system incident substantially in the manner discussed below;

5. the recovery CPU (usually the failing processor) which receives the system incident, signals any other CPUs to cease processing and masks out I/O interrupts for the preferred guest during a system incident. The CPU signaled to stop records the state of the V=R guest in the VMDBK just before it stops. A bit VMDGSBNC is set (turned on) indicating that a bounce is occurring now when termination begins following a system incident. This bit is turned on early following a system incident; and 6. the status of the preferred guest is restored and the preferred guest is restarted (reactivated) when the host operating system is restored. (As indicated above, an attempt will always be made to recover the preferred guest if pointers SYSVMVR and SYSVRLOC are not zero and if bit VMDGSURV in VMDBK is not zero.)

Initializing Host Storage (HCPLOD)

The host SCP is initially hardware IPLed such that data and instructions at absolute addresses 000 hex through 017 hex and 100 hex through 15F hex in host absolute page 0 load the host SCP into host main storage thereby creating the VM system. The contents of these absolute addresses in host storage are collected in preallocated areas (in control blocks in these areas) in the reserved region in order to provide for recovery following a system incident. These preallocated areas are preserved through each system incident. (Software module HCPLOD actually loads the host SCP, calls other modules and permits the dispatcher to dispatch general (user) work.) The IPL sequence provides for the host SCP to be loaded above 16 megabytes. This prevents the destruction of pages within the V=R area if the guest is larger than 14 megabytes.

When a preferred guest is initially logged on to the VM system, the V=R region in host storage is assigned to the preferred guest. The pointer SYSVMVR is set to the block (VMDBK) which is initialized for guest survival. Otherwise, the pointer SYSVMVR will be zero indicating that there is no active V=R guest. The SYSVMVR pointer is used to determine if a guest is ready for survival upon restoration. The bit VMDGSURV in the VMDBK block indicates whether survival is possible by being turned on (set to one). That is, VMDGSURV will indicate whether survival is possible as long as a condition has not been encountered that suppresses guest survival. This bit is turned off (set to zero) when a condition which suppresses guest survival has been identified. The preferred guest VMDBK in the V=R area will be used for guest recovery. SYSVRLOC always contains the address where the preferred guest VMDBK will be established when the V=R region is later restored following a system incident.

The guest survival recovery block (GSRBK) is established (allocated) in the reserved region and is pointed to by the pointer VMDGSRBK if a guest is eligible for survival. The pointer VMDGSRBK is set when GSRBK is allocated when the V=R guest logs on and is released when the V=R guest logs off. It is not reset during a system incident. GSRBK and the VMDBK contain enough information to restore low (page zero in host) storage and to record I/O device blocks (RDEVs) for the preferred guest. (GSRBK is an extension of VMDBK for this purpose.)

I/O devices dedicated to the preferred guest are assigned to a unique interrupt class. For each I/O device dedicated to a preferred guest, a device slot in the reserved area is allocated for retaining the dedicated I/O device information during a system incident in order to prepare for a potential recovery of the preferred guest on its dedicated I/O device. When a guest has been recovered and the host system has completed the bounce, (user) work resumes in the guest after the instruction which was interrupted. This resumption may be reflected as a machine check or as a long duration instruction execution.

Occurrence Of A System Incident (HCPVRRCD)

When a system incident occurs, data in location 000 hex through 017 hex and 100 hex through 15F hex are recorded (preserved) in guest control blocks GSRBK and VMDBK in a reserved area of host absolute storage (at the end of the V=R area) to maintain the integrity of data in the V=R region. The locations in the reserved area will otherwise be disturbed by hardware if not preserved. In effect, if a system incident occurs and guest survival is not prevented, the V=R guest environment is recorded in the reserved region in host storage. (An attempt will always be made to recover the V=R guest following a system incident if SYSVMVR, VMDGSURV and VMDGSBNC (defined below) are not zero. When the VMDGSIPL bit in control block VMDBK is set (on), then the preferred guest is re-IPLing when a system incident occurs.) A checkpoint of the preferred guest I/O configuration is made. The preferred guest is then suspended by stopping all logical CPU's, and disabling I/O on the interrupt subclasses assigned to the preferred guest. In particular, the first processor which receives the system incident must signal any other processors to cease processing, and the first processor suspends the preferred guest. The bit VMDGSURV indicates if a guest can survive. This same bit can be turned off for a variety of reasons at any time indicating that a guest cannot survive, and a message will be provided to the system operator indicating the reasons that the guest cannot survive when a condition (described above) is detected. The bit VMDGSURV is used to suppress guest survival processing when a condition which prevents guest survival has been identified. (The pointer VMDGSRBK will always be reset to zero if a guest cannot survive.) The bit VMDGSBNC is set (turned on) when a system incident occurs and will be reset (turned off) when the bounce is complete.

The data containing the information to restore the lower part or portion of the guest storage (page zero) is recorded in the guest survival recovery block (GSRBK). For example, GSRBK includes the IPL PSW, i.e. the data in absolute addresses 000 hex through 017 hex taken from the V=R page 0 region in the host, the machine check logout area and bootstrap program, i.e. the data from absolute addresses 100 hex through 15F hex taken from the V=R page 0 region in the host, and a device block (RDEV) to be used for preferred guest survival. In particular, the data in addresses 000 hex through 017 hex in host absolute storage contain the current IPL PSW and the current channel command word (CCW) in an IPL CCW chain, i.e. the IPL record. The GSRBK is shown in FIG. 3 and includes the IPL record (contents of host absolute addresses 0 through 23 (000 hex through 017 hex)), I/O device addresses, machine check blocks for the V=R guest and timer request to be reflected.

The areas containing the information copied from the real device (RDEV) blocks are chained together in the V=R area until such time as recovery can move the information back to the refreshed RIO space (the SYSGEN I/O area) within the host nucleus. The HCPVRR module (discussed below) records each RDEV along with at least two I/O control blocks (IORBK) for each device. However, as indicated above, guest survival is suppressed if insufficient space was allocated to preserve device information for RDEVs, i.e. devices for a V=R guest.

In general, when a system incident occurs, commands which were in process at the time of the system incident will be terminated. Messages from and/or to the V=R guest which were not received will be lost. If the guest was in a stopped state at the time of the system incident, it will not be restarted when guest survival has completed successfully. If a pending or active console function read had been outstanding at the time of the system incident, the read will be preserved. Since the guest will be in a disconnected state after the system incident, the user has approximately fifteen minutes to reconnect to avoid being forced after surviving with a preserved console function read.

Normally, a system incident is the result of a single error (abend, machine check or check-stop). Errors, though, are not necessarily independent events; there is an increased probability of detecting another (related) error immediately following a first detected error. (See U.S. Pat. No. 4,464,751 assigned to the assignee of the present invention which discusses machine check coordination.) The assumption, however, is that only one error will occur at a time; there is some doubt that the VM system could continue reliably if more than one error occurred at a time. Generally, if there is more than one error involved in a system incident then the preferred guest will not survive. The following are a few of several exceptions to the above rule. A preferred guest will survive even though there is more than one error when:

1. termination is initiated from a first CPU because of an error, but a second CPU is check stopped and the check stop goes undetected. The check stop goes undetected because either the second CPU failed to provide the required MFA (malfunction alert) or the MFA was made pending after the first CPU stopped accepting external interruptions;

2. termination is initiated from a first CPU and a second CPU is reset (by HCPSGPST). The reason for this exception is that the reset may not have occurred as a result of a second error (the first error terminating the first CPU is recognized as the only error); and 3. termination is initiated from a first CPU, a second CPU begins to abend substantially simultaneously and the abending CPU doesn't complete the abend. Instead, the second CPU becomes involved in a microcode loop or a disabled software loop and consequently gets reset (by HCPSGPST). In other words, the abend never proceeds so far that it is recognized (by setting PFXHABEN) as a second error such that guest survival would not be allowed.

If guest survival fails, the guest is not reactivated when the VM system recovers. Messages are sent to the system operator (and possibly the user) to indicate the reasons for termination.

Following Occurrence of System Incident

After an incident occurs and the preferred guest is maintained in a disconnected state and its function is reactivated (if guest survival has not been de-activated). The guest is disconnected because the physical terminal simulating the console is no longer logically connected to the guest (VMDRTERM=0). (The field VMDTERM in VMDBK, prior to the occurrence of the system incident, points to the I/O device block (RDEV) of the user's display station.) The preferred guest's program status word (PSW) is examined and validated. The host storage is not initialized for a preferred guest when the preferred guest is being reconnected after a system incident. Absolute storage locations 000 hex through 017 hex and 100 hex through 15F hex are restored in the host's absolute page 0 region in order to return the guest to its operational state. The data in addresses 000 hex through 017 hex provide the new PSW and store the current PSW as the old PSW during reactivation following the interruption due to the system incident.

In the case where the preferred guest had begun execution (interpretation) of an instruction prior to the occurrence of the system incident, but did not complete the instruction an instruction processing damage machine check will be reflected to the guest. Instruction processing damage occurs when the preferred guest begins to execute an instruction, but does not finish (reach ENDOP) prior to the occurrence of a system incident. In order to account for simulated machine checks such as instruction processing damage (as well as timer damage), the host control program, i.e. VM/XA, creates virtual (pseudo) machine checks that do not necessarily correspond to real machine checks.

As indicated above, the VM system will continue to run in response to a bounce after a system incident occurs, but the preferred guest will not be recovered under certain conditions. For example, if the reserved area in the V=R area were to become exhausted, page allocations would be made from real storage. (When the reserved area becomes exhausted, pageable storage will be used, but may not be maintainable during a system incident such that the guest will not be recoverable.) The V=R area will only be used by the preferred guest and cannot be cleared. Any non-used space within the reserved region can be returned to pageable storage for other use. The I/O device blocks (RDEVs) are not initialized in response to a bounce.

If the operating system of the preferred guest cannot be allowed to recover, i.e. due to loss of its data integrity, the user can choose to virtually IPL a standalone recovery program since storage of the V=R area is left intact. These programs, like the MVS IMS Log Tape Terminator Utility, can recover records that were not written before the failure.

Software Modules Supporting Guest Recovery

The flow chart in FIGS. 4, 5, 6 and 7 show generally the response of the system to a system incident and the recovery of the V=R guest following the system incident.

Block 100 represents a software module HCPVRRLN called by HCPLOGON (block 98) that preallocates a region (or area) of host storage for a preferred (V=R) guest. In particular, this module allocates GSRBK and initializes VMDBK for guest survival. This module is called when the V=R guest (user) logs on to the system. However, it is not called when the V=R guest is being reactivated following a system incident. Upon exit from this module, a lock SYSVMVR is obtained and VMDGSRFL indicates that the free storage chain in the reserved region is being updated. The free storage manager attempts to satisfy all requests for free storage made on behalf of the V=R guest (user) from the reserved region for that user. The address of the GSRBK created in the reserved area is contained in VMDGSRBK. The V=R guest GSRBK contains sufficient information to restore low host storage and records RDEVs for the V=R guest. General purpose register R11 contains the address of the VMDBK of a V=R guest and the V=R guest VMDBK must not already be in use upon exit from this module. (Block 102 represents a software module HCPBVMBK also called by HCPLOGON to allocate space (pointed to by R11) for a preferred guest VMDBK in the reserved area. The address of the special VMDBK is located in SYSVRLOC. This address is also placed in SYSVMVR upon completion of the preferred guest log-on process.)

If a CPU detects a system incident (at block 108) the software module HCPWRPUP at block 114 is invoked by the CPU to obtain termination lock. If this module cannot obtain the termination lock, then another CPU already obtained the lock making it the recovery CPU. In this case the present (non-recovery CPU) terminates itself. The system must obtain the state of the terminating CPU when the decision is made to stop it. If this module does or does not obtain the termination lock, the module disables I/O on the interrupt subclass dedicated to the V=R guest. The software module HCPSGPST at block 116 (FIG. 5) provides for the termination of all other CPUs i.e. for termination of any CPUs which have not detected a system incident.

Blocks 118 and 120 are software modules HCPISHDA and HCPISHDV which are called by the module HCPWRPUP to disable all devices and non V=R guest devices, respectively, before optionally taking a dump.

The module HCPISHDA at block 118 disables all I/O devices at system termination and the module HCPISHDV at block 120 disables all non V=R guest I/O devices at system termination. Specifically, HCPISHDA disables all subchannels in the I/O configuration by resetting the subchannel enable flag for all subchannels. HCPISHDV disables all system and pageable guest subchannels by resetting the subchannel enable bit for all subchannels that are not assigned to the preferred guest.

Block 122 and block 124 are software modules that are not related solely to guest recovery, i.e. one of the modules establishes new checkpoints.

Block 126 represents a software module HCPVRRCD that records data to permit a preferred guest to survive a system incident. This module is called by HCPWRPUP, when nothing has occurred which would prevent guest survival, to record the preferred guest environment in the reserved region in host storage. In particular, locations 000 hex and 017 hex in page zero in host absolute storage will be recorded as described above. The module also supervises the process of recording the status of the preferred guest at a system incident, i.e. during system termination. The HCPVRRCD module is only called while the system termination lock (obtained by module HCPWRPUP) is held. The output of this module provides information containing the status of the preserved guest recorded in control blocks GSRBK and VMDBK in the reserved area (as described above).

Block 132 represents placing the host machine in a disabled wait state following a system incident. In this case, guest survival would not be possible. Any attempt to restart a preferred guest at this point would cause unresolvable data integrity problems. (However, recovery programs can recover records that were not written prior to the system incident.)

The software module HCPVRECK at block 134 (FIG. 6) is called by HCPVRRCD to checkpoint the preferred guest's I/O configuration. The module HCPVRECK also verifies that the real I/O configuration allows guest survival to occur. All simulated devices are removed (detached) from the preferred guest's I/O configuration, i.e. all references to those devices are cleared. All guest devices are reset to a known state including lock reset, and queues are verified and repaired. All preferred guest I/O interrupts are disabled. The RDEVs are copied into preallocated areas (slots) in the reserved area of the V=R region of host storage.

Block 136 represents the software module HCPVRQIO that is called by the module HCPVRECK to obtain data from the guest survival recovery block GSRBK. The module will load the address of the GSRBK to obtain the address of the I/O device recovery (checkpoint) queue object needed to store information about the preferred guest's dedicated I/O device blocks (RDEVs). Dedicated (non-shared) device information is checkpointed by being copied into "slots" which are preallocated in the reserved area of the host. When a system incident occurs and the guest is survivable, the device information in the saved slots will be copied back into the RDEV in RIO space. Each RDEV loaded in RIO space will be modified by data from the copy of the device information collected in the slots prior to bounce following a system incident.

The module HCPVRECK also calls the following software modules:

1. Module HCPVREV1 at block 138 verifies that a pageable guest I/O device is not on a channel interrupt queue if it is not in the I/O configuration.

2. Module HCPVREV2 at block 140 verifies that an IORBK queued from a preferred or pageable I/O device is a safe block to leave after a system incident. (IORBKs are control blocks in the system VMDBK containing interrupt information and I/O requests, and are copied into the reserved region in the event of a system incident.)

3. Module HCPVREV3 at block 142 verifies that all channel report word block CRWBKs queued to the channel class control block CHCBK are within the reserved area.

4. Module HCPQVRFY at block 144 tests a queue for various types of errors, identifies the problems, and attempts to repair the queue.

Block 128 represents a software module HCPMCWMD that will issue messages relating to the prevention of a bounce and guest survival, i.e. it will provide an indication of multiple machine checks indicating multiple system incidents. It looks at each of the CPUs, checking for the following error conditions: abends, machine checks, and checkstops. It preserves a description of any error found so that after the bounce, a machine check can be reflected to the preferred guests if the preferred guest was affected by the error conditions. The preservation of any error found is as a result of what is termed postmortem examination which handles multiple system incidents.

Block 130 represents a software module HCPLODNC that calls software module HCPCKPRS at block 146 (FIG. 6) which refers to and validates system data. The module HCPLODNC next calls software module HCPVRRLD at block 148 which *reloads* the V=R environment from the reserved region in host storage following a system incident.

Block 150 represents the software module HCPVREST which is called by the module HCPVRRLD to restore the preferred guest's I/O configuration when there is a guest to be recovered. In other words, the RDEVs are restored to their checkpointed state. If one RDEV could not be found (restored), recovery will be terminated. The module HCPVREST calls the module HCPVRQIO at block 152 to obtain data from the guest survival recovery block GSRBK in order to store information in the reserved area in the host, i.e. information about the preferred guest's dedicated I/O devices (RDEV checkpoint queue) as explained above. The module HCPVREST also calls the module HCPSCHRU at block 154 to obtain the address of the corresponding dedicated I/O device address. The module ends by restoring all checkpointed RDEVs.

Block 156 represents the software module HCPISUOP which continues refreshing the host SCP. HCPISUOP then calls the module HCPVRRST at block 158 (FIG. 7) to *restart* the V=R user (preferred guest). The V=R guest will be started on the dedicated processor (CPU) if one is available. The module HCPVRRST is executed at the point when the VM system can accept standard I/O interrupts for the guest and allow a guest CPU to run. All collected interrupts or user work which is in progress is re-queued. The dispatcher, i.e. the module that selects work to be run, is notified that the V=R guest is ready to run.

Block 164 represents a software module HCPVRVRS which is called by HCPVRRST, just before the V=R guest restarts after a system incident, in order to re-establish virtual CPU fields and chains in the preferred guest VMDBK to a usable state. HCPVRVRS, along with HCPVRRLD, provide for the reconstruction of the V=R guest VMDBK prior to restart. The HCPVRVRS module handles guest timers, console function, virtual floating external interrupts, and outstanding guest processor controller requests.

Block 160 represents a software module HCPVRRGM which calls a software module HCPGMCGS at block 162 to reflect guest machine checks, if any, when the guest is run. The module HCPGMCGS interprets the system incident, as recorded in permanent storage by the HCPMCW module, and guest state and makes an appropriate machine check pending for the V=R guest when reactivated. See the following chart which shows when the module HCPGMCGS makes machine checks pending for the V=R guest.

Block 172 represents the software module HCPAPIII which is called by HCPISUOP to connect any secondary real CPUs to the host configuration. The field VMDDEDCP preserves the logical CPU address of the host processor dedicated to the guest so that the master processor can be linked to the dedicated processor. If additional CPUs are available, an appropriate number will be dedicated to the V=R guest. In an multi-processing (MP) environment, the V=R guest will be dedicated to as many CPUs as are required. If there are insufficient CPUs to be dedicated to the V=R guest, the V=R guest will share the master CPU with all other system functions.

Block 180 represents handling pending console "reads" which were preserved by another module discussed in the application (HCPCFMBK).

Block 174 represents the software module HCPIOPER which calls the module HCPLOGOP at block 176 to log on the system operator. If the system operator is the same as the V=R guest, the V=R guest is reconnected following a system incident. (Module HCPCFMRD controls the running of the operator's virtual machine.)

Approximately every thirty seconds, while the V=R guest is running, software module HCPSTPGS calls software module HCPVRRFX to determine if V=R storage problems have occurred since the last call, i.e. reserved region has been exhausted. When storage problems are detected, the HCPVRRFX module will send messages to the host operator and/or to the V=R guest indicating that guest survival is impossible. When the V=R guest (user) logs off, the GSRBK is released and the V=R guest is cleared for subsequent use.

Summary of Important Modules

Figure 8:
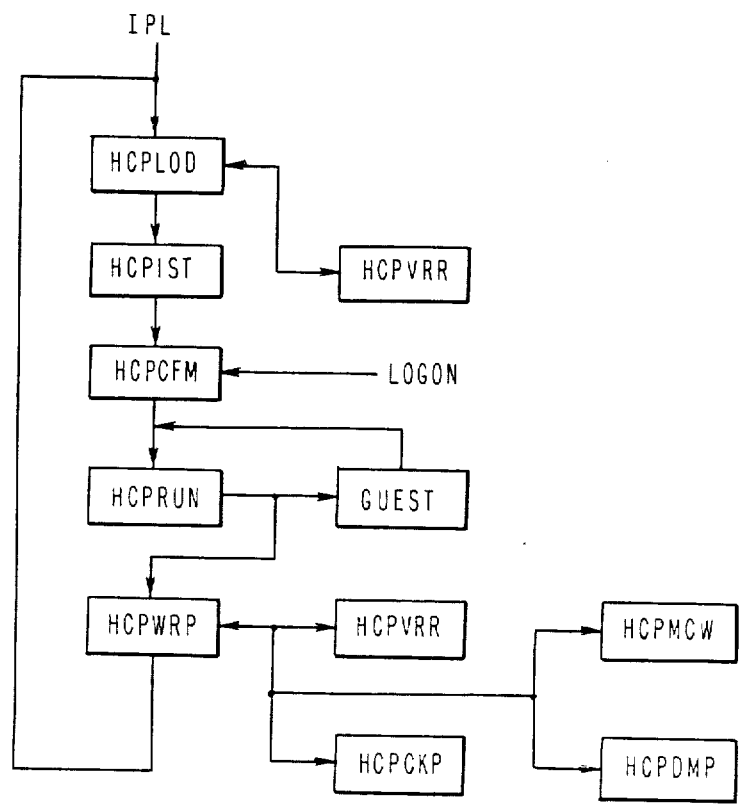
FIG. 8 is a diagram showing the flow of control within the major modules of FIGS. 4-7.

The flow of control within the major modules is shown in FIGS. 8.

The sequence for a normal (system operator) IPL (shown in FIG. 8a) is as follows:

1. HCPLOD is read from a disk and control passes to it.

2. HCPLOD invokes HCPCKP which determines that the system was given a true IPL (precluding guest survival).

3. HCPIST is entered for completing the system initialization.

4. HCPCFM is entered to place the system in console function mode (awaiting commands).

5. LOGON is issued by a user authorized to use the V=R area.

6. HCPRUN is repeatedly entered (loop) to allow the virtual machine operating system to run. (The virtual machine operating system runs until it requires instruction simulation (not shown) or its time slice ends.)

7. A system incident occurs. (At this point, the system stops running normally and enters the bounce condition.)

8. HCPWRP is entered to determine whether the system can bounce. HCPWRP calls HCPVRR, HCPCKP and HCPMCW which preserve the state of the virtual machine operating system to allow the virtual machine to survive the system incident. A system dump occurs via HCPDMP. Control is transferred back to HCPLOD.

Once HCPWRP has transferred control back to HCPLOD, the bounce has begun. The sequence for a bounce is as follows:

9. HCPLOD determines that it has been entered from HCPWRP rather than from a hardware IPL. Since virtual machine survival remains a possibility, HCPLOD calls HCPVRR to restore the data saved prior to the bounce. HCPLOD loads the remainder of the host operating system.

10. HCPIST is called to re-initialize the system.

11. HCPRUN is (eventually) permitted to resume the execution of the virtual machine operating system. The virtual machine has survived.

Additional Guest Definition Block (VMDBK) Fields

The VMDBKs for the V=R guest will be created in the reserved region. During an attempt to recover the guest, address fields in the VMDBK are examined to determine if they address fields outside of the reserved region. If an address field does, and it cannot be cleared (zero), then the VMDGSURV bit is turned off and guest survival fails.

At any point during the operation of the data processing system, the running guest machine definition block VMDBK will be one of several types. Its type is assigned when the VMDBK is created and is not changed until the VMDBK is logged off. However, guest survival is prevented if VMDBK is not assigned as a user type (V=R guest) VMDBK. An inappropriate VMDBK, such as one using virtual SIE, will not survive and the system will terminate. The type of VMDBK assigned is coded in a field VMDTYPE of the VMDBK and will not change during a system incident. The address of the virtual CPU which the VMDBK represents is contained in a field VMDCPUAD in the VMDBK. The CPU address must not change because the V=R guest operating system should run on the same virtual CPU after a system incident as before a system incident. (Note: The occurrence of an abend or a machine check or a check stop can cause a CPU (in a dyadic VM system) to fail. However, the failing CPU is not necessarily the CPU that caused system termination. The CPU may have failed during termination processing initiated by another CPU. The CPU that did not cause termination may be either reset or check stopped during termination processing. However, whereas a CPU check stop may cause termination, a CPU reset is never the cause for termination.)

The user VMDBK is a V=R guest control block that is preserved in a reserved area at the end of the V=R area of host absolute storage. This reserved area is preserved because it contains all of the device information and control blocks necessary to restore the V=R guest after a system incident. The guest survival recovery block GSRBK associated with the user VMDBK is also used for guest recovery. Neither block references storage outside of the reserved area that has been re-initialized and cleared after a system incident in order to prevent integrity problems.

The VMDBK includes a pointer VMDFSAPT to the first free block of storage in the reserved area, a counter VMDFSACT for keeping track of the number of free blocks in the reserved area, a pointer VMDLCPTR to the next free block of storage in the reserved area and the length of the current block of free storage (bytes) in the reserved area. The pointers control the allocation of storage in the reserved area.

Since the surviving guest is logged on disconnected following the system incident, it cannot have an active read until it reconnects. The active read is preserved by chaining it to a pending read. A subsequent console function read (next console input) can be satisfied only when the pending read, i.e. the converted read, is satisfied after the V=R guest has reconnected. A field VMDCFRD is properly set (turned off) so that the pending read can be performed once the guest is re-dispatched. All console functions, including commands, that were in process are lost and will not be performed. A bit VMDEXCF is set to indicate that console function execution is in progress and is reset, following the system incident, to conform with the loss of the console functions.

The guest machine definition block (VMDBK) further includes: (1) the guest machine state descriptor VMDSDSC which describes the guest machine to the host (real) machine, (1a) a description of the guest machine mode (or type) of the guest, i.e. System/370 type machine, (1b) an indication that the guest is a preferred guest, (1c) the contents of the guest's general registers 14 and 15, (1d) the guest storage size, i.e. the highest address which may be used by the guest, (1e) the guest program status word (PSW), (1f) contents of the guest control registers 0 through 15, (2) the contents of the guest's general purpose register 0 through 15, and (3) the guest floating point register 0 through 6.

The guest state descriptor, the descriptions of the guest (type, preferred), the guest PSW, the registers, and the guest real main storage extent must all survive a system incident. The guest PSW will be changed *after* the system incident if there is a pending interrupt. Any damage to the guest PSW, or to the control registers, or to the general purpose registers, or floating point registers, or to the general register caused by a system incident will be reported to the guest through a machine check.

Generally, individual fields in the VMDBK are examined for validity, re-initialized, or set to some predetermined value. Examples of the kinds of actions performed on fields have been described above.

Processor Controller Request Processing

Processor controller request processing can be organized into three distinct states for the purpose of guest survival.

The first state is when the controller is processing a guest request and does not finish before the occurrence of a system incident. In this case, the guest will receive a machine check (see following table) and will probably not receive a processor controller response.

The second state is when the guest has received a condition code (of zero) indicating that the request (command) was accepted and then expects an external interruption from the processor controller before a system incident occurs. In other words, is the external interruption still available or does an external interruption have to be stacked (made available) to fulfill the expected external interruption requirement? In this case, a machine check may or may not be reflected to the guest (see below) since the type of machine check would depend upon what the guest was doing at the time of the system incident. Again, refer to the following table.

The third state is when the processor controller request has completed and a PSW swap is attempted in order to complete the posting of the external interruption to the guest before a system incident occurs. In this case, the external interruption will be lost and a machine check will be reflected to the guest. Refer to the following table.

The processor controller data block HCPFINBK is pointed to by data block address (field) FINPCDBA if there is an active processor controller request. Otherwise, the field (at address 10 hex) is zero. The data block address is not lost over a system incident.

Reflected Guest Machine Checks (HCPGMC)

In general, there are several ways to maintain integrity of the guest following a system incident that damages (affects) the guest. One way, which was discussed above, is to terminate the guest. Another way is to reflect machine checks to the guest.

When a real machine check causes a system incident, data identifying the machine check is preserved in the reserved area in storage. The machine check is presented (reflected) to the guest operating system which is affected by it. I/O interrupts are queued either in the hardware (by not allowing the hardware to present interrupts while a bounce is occurring) or by retaining I/O interrupt status for interrupts that had occurred prior to the bounce, but which had not yet been reflected to the guest operating system. If the host operating system is in the process of simulating a guest operating system instruction when a system incident occurs, the integrity of the guest operating system could be lost if an attempt were made to "reissue" the simulated instruction. The host operating system then creates a pseudo-machine check, identical to the hardware machine check condition called instruction processing damage, which it reflects to the guest operating system. This reflection informs the system of the host operating system's inability to complete the instruction.

The software module HCPGMC determines whether conditions exist within the VM system that require the creation of a (simulated) machine check for the V=R guest. When a real machine check does not occur, there may still be a need for the V=R guest to receive a simulated machine check. For example, if an abend occurs after the host has begun simulating a privileged instruction (or operation), but before it has finished (reached ENDOP), then an instruction processing damage machine check must be created.

In general, a system damage machine check will be reflected to the guest:

1. Whenever queued work is lost thereby compromising the V=R guest operation. (Queued work includes the urgent (CPEBK) stack (VMDQURCP), the normal (CPEBK) stack (VMDQCPEF), and the call from CFM (CPEBK) stack (VMDCFCAL).) Queued work is lost because the CPEBK exists in host storage outside the V=R area and cannot be preserved following a system incident.

2. Whenever the guest was running on a CPU that was either reset or check stopped, regardless of the nature of the system incident. (Since, for both reset and check stop, the state of the guest at the time of the system incident is indeterminate, the most severe machine check is reflected to the guest.)

In particular, the following table describes examples of machine check (M.C.) conditions, if any, that will be reflected to a surviving V=R guest if the guest was dispatched at the time of the abend. A system damage machine check is reflected to the guest by assuming that work was not stacked on one of the three dispatcher queues, but was stacked on one of several queues in the VMDBK.

Each column in the following table provides for the possible state that the guest could have been in when interrupted (as indicated at the top of each column). Each row provides the possible failures (abends, check stops, etc.) that could occur (as indicated at the left of each row).

Fields in the VMDBK and the machine check handling block MCVBK will identify the states of the guest. The MCVVMDBK field identifies the guest as being dispatched on the failing CPU. Bit MCVHRUN, used together with MCVVMDBK identifies when the guest was in SIE on the failing CPU.

Other Characteristics of Guest Survival

Dedicated devices may suffer a loss of I/O interrupts during a system incident. No special attempt is made to recover spool files beyond the normal checkpoint procedures. (Spooling is a commonly known buffering technique.) Simulated devices will be removed from the V=R guest I/O configuration. Simulated devices include virtual channel to channel adapters, virtual unit record devices, virtual displays (including DIALed lines), and virtual consoles. As a result, I/O critical to the guest operating system should not be assigned to simulated devices.

Device status is generally maintained for V=R dedicated I/O devices. Queued I/O requests, interrupts, intermediate status, and condition codes for dedicated devices are generally retained. The guest operating system can lose guest I/O requests and interrupts during three critical periods: one, when the task which translates virtual start requests to real start requests is terminated by a system incident before it is accepted by the real channel subsystem; two, when the task which accepts real interrupts and transforms them into virtual interrupts is terminated by a system incident before it is accepted by the guest operating system; and three, if the system runs out of preallocated IORBKs which are used for preserving the I/O requests and interrupts.

It is understood by those skilled in the art that the invention disclosed and claimed herein will permit multi-processing guests employing either IBM System/370 architecture or IBM System/370 extended architecture to survive system incidents which force the host operating system to bounce. The invention disclosed and claimed herein will also run in an associated processor environment.

While the invention has been particularly shown and described with references to preferred embodiments thereof, it will be understood by those skilled in the art that the foregoing and other changes in form and details may be made therein without departing from the spirit and scope of the invention.

|  | GUEST IN SIE | GUEST INITIATED WAIT STATE | GUEST IN CP INSTRUCTION SIMULATION | GUEST IN CP FOR SOME OTHER REASON (i.e. INTERRUPT HANDLING, COMMAND PROCESSING, etc.) |
|---|---|---|---|---|
| | GUEST DISPATCHED ON A FAILING CPU | | | |
| Guest was dispatched on a CPU that was reset | System Damage M.C. | System Damage M.C. | System Damage M.C. | System Damage M.C. |
| Critical work which was q'd for the guest | System Damage M.C. | System Damage M.C. | System Damage M.C. | System Damage M.C. |

-continued

|  | GUEST IN SIE | GUEST INITIATED WAIT STATE | GUEST IN CP INSTRUCTION SIMULATION | GUEST IN CP FOR SOME OTHER REASON (i.e. INTERRUPT HANDLING, COMMAND PROCESSING, etc.) |
|---|---|---|---|---|
| was lost over the restart or deferred work was queued. | | | | |
| Processor was check-stopped | System Damage M.C. | System Damage M.C. | System Damage M.C. | System Damage M.C. |
| Error was CP Abend (+ none of the above) | N/A | No Machine Check | Processing Damage M.C. | System Damage M.C. |
| Error was a system damage M.C. (+ none of the above) | Reflect same M.C. | Reflect same M.C. | Reflect same M.C. | System Damage M.C. |
| Error was a processing damage M.C. (+ none of the above) | Reflect same M.C. | Reflect same M.C. | Processing Damage M.C. | System Damage M.C. |
| Error was some other M.C. (+ none of the above) | Reflect same M.C. | Reflect same M.C. | Processing Damage M.C. | System Damage M.C. |

| | GUEST NOT DISPATCHED OR GUEST DISPATCHED ON A NON-FAILING CPU |
|---|---|
| Critical work which was q'd for the guest was lost over the restart or deferred work was queued | System Damage M.C. |
| Error was a machine check and guest owns failing stor. (+ none of the above) | Reflect System Recovery |
| Any other terminating incident | No Machine Check |

Having thus described our invention, what we claim as new and desire to secure by Letters Patent is:

1. In a data processing system which includes storage, a channel subsystem having I/O devices attached thereto, at least one real machine executing a host operating system and a start interpretive execution instruction that initiates the operation of at least one virtual machine having a virtual processor executing a guest operating system, a method for providing for virtual machine survival following a system incident such as a machine check including a simulated machine check, such as instruction processing damage, which occurs when said host operating system does not successfully simulate an instruction of said guest operating system, and timer damage, or a channel check or a checkstop or a malfunction detected as part of an I/O operation such as an invalid checking block code detected in storage or in a real storage key, comprising the steps of:

assigning a first and second nonvolatile area of said storage to said virtual machine by said host operating system in which said first area is in said virtual machine main storage area and said second area, which is an extension of said first area, contains control blocks that describe said virtual machine to said host operating system which controls said virtual machine in said first area of said storage, accessing said second area of said storage for requests made for said virtual machine prior to detection of said system incident, detecting said system incident, determining that said virtual machine is eligible for survival by detecting a bit set in a field in one of said control blocks in said second area of storage prior to said detection of said system incident, copying information about I/O devices dedicated to said virtual machine from said first area of said storage to said second area of said storage, recording the cureent status of said virtual machine in said second area of storage and verifying that said dedicated I/O devices will permit survival of said virtual machine, all for the purpose of maintaining the integrity of said virtual machine following said survival, terminating said real machine and suspending said virtual machine in response to the detection of said system incident, refreshing said host operating system in said real machine following the detection of said system incident and restoring said virtual machine in said first area of said storage with data in said second area of said storage, restoring said virtual machine using said I/O devices dedicated to said virtual machine in said first area of storage from said second area of said storage and restarting said virtual machine, and presenting the error that caused said system incident to the guest operating system of said virtual processor affected by said error once said virtual machine is restarted following said refreshing of said host operating system in said real machine in order to prevent said virtual machine from damaging its operating system.

2. The data processing system of claim 1 in which said control blocks describing said virtual machine are preserved to restore said first area of storage which is low V=R storage in said real machine to provide for recovery of said virtual machine.

3. The data processing system of claim 2 in which said low storage is page zero in said real machine.

4. The data processing system of claim 1 in which status for one of said dedicated I/O devices is retained in said second area of said storage during said system incident for subsequent use during the recovery of said virtual machine on said one I/O device.

* * * * *

UNITED STATES PATENT AND TRADEMARK OFFICE
CERTIFICATE OF CORRECTION

PATENT NO. : 4,674,038
DATED : June 16, 1987
INVENTOR(S) : D. P. Brelsford, et al.

It is certified that error appears in the above-identified patent and that said Letters Patent are hereby corrected as shown below:

Inventor Name Lynn A. Czak should read Lynn A. Wilczak.

Signed and Sealed this

Thirteenth Day of October, 1987

*Attest:*

DONALD J. QUIGG

*Attesting Officer*  *Commissioner of Patents and Trademarks*